Feb. 20, 1934.  M. G. KLEMME  1,948,118
COOKING STOVE
Filed Feb. 4, 1933   2 Sheets-Sheet 1
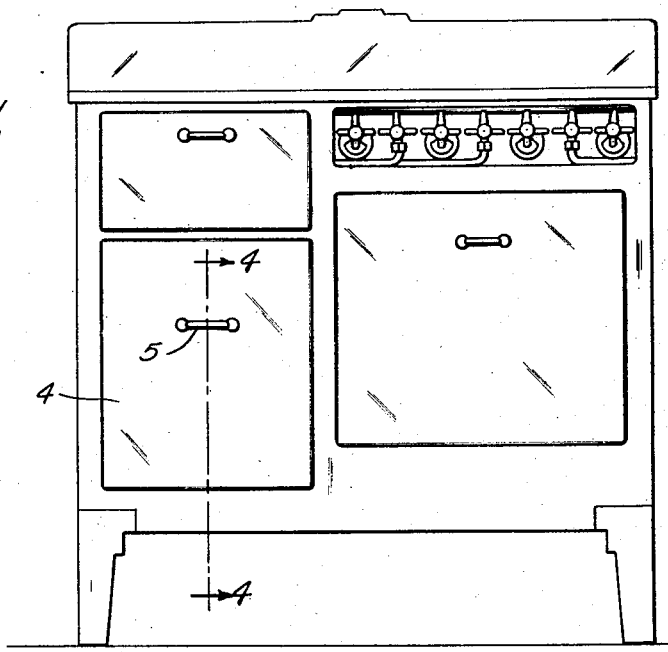
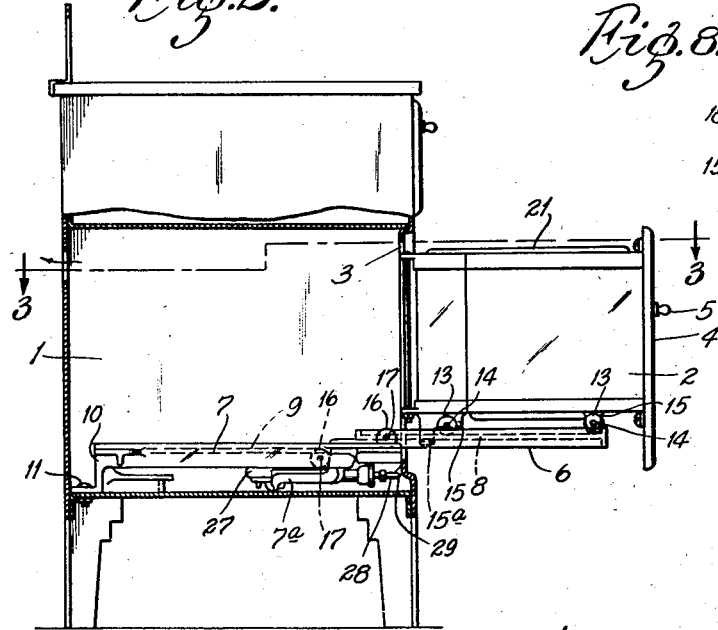
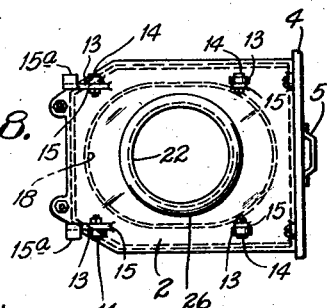
INVENTOR:
Maurice G. Klemme
HIS ATTORNEYS.

Feb. 20, 1934. M. G. KLEMME 1,948,118
COOKING STOVE
Filed Feb. 4, 1933 2 Sheets-Sheet 2
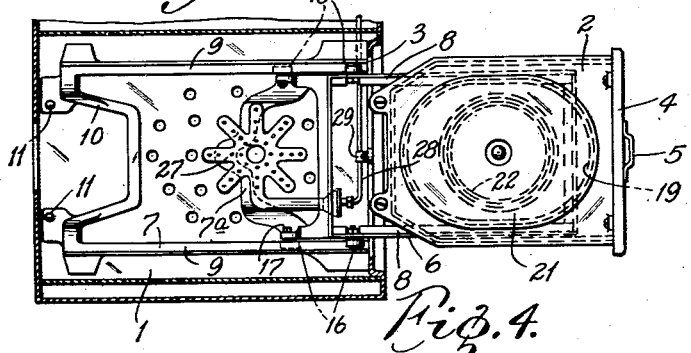
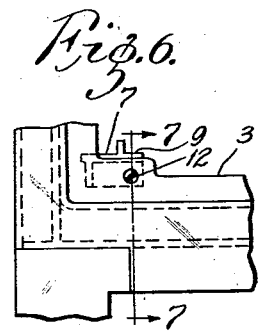
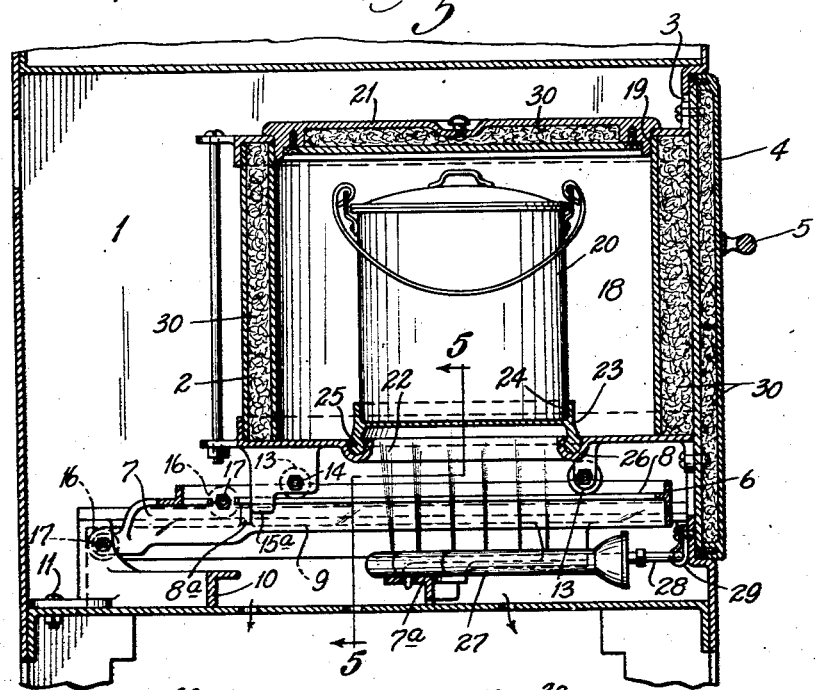
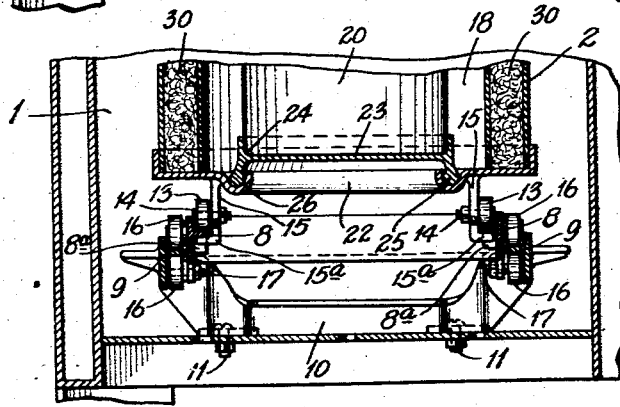

Patented Feb. 20, 1934

1,948,118

UNITED STATES PATENT OFFICE 1,948,118

COOKING STOVE

Maurice G. Klemme, Belleville, Ill., assignor to Eagle Foundry Company, Belleville, Ill., a corporation of Illinois Application February 4, 1933. Serial No. 655,146

10 Claims. (Cl. 126—340)

This invention relates to cooking stoves. The invention has for its principal objects to provide for withdrawal of the oven from the stove so as to facilitate access to the contents of the oven; to provide for the proper support of a cooking vessel in said oven; to provide for heating the oven; to provide for slow cooking or hot storage of the food in the oven after the heat is turned off, and to provide for simplicity and cheapness of construction and compactness of design. The invention consists in the cooking stove and in the construction, combinations and arrangements of parts hereinafter described and claimed.

In the accompanying drawings, which form part of this specification and wherein like symbols refer to like parts wherever they occur, Fig. 1 is a front elevation of a cooking stove provided with an oven embodying my invention, Fig. 2 is an end elevation partly in section, of the stove with the drawer, which contains the oven, shown withdrawn from the drawer compartment, Fig. 3 is a horizontal section on the line 3—3 in Fig. 2;

Fig. 4 is a vertical section on the line 4—4 in Fig. 1,

Fig. 5 is a vertical section on the line 5—5 in Fig. 4,

Fig. 6 is a fragmentary front elevation of the stove in the region of one of the lower corners of the opening in the drawer receiving compartment, Fig. 7 is a vertical section on the line 7—7 in Fig. 6; and Fig. 8 is a bottom view of the drawer.

In the accompanying drawings, my invention is shown in connection with a gas range provided with a compartment 1 adapted to receive a box-like receptacle or drawer 2 through an opening 3 in the front of said compartment. The front wall 4 of the drawer 2 is provided with a handle 5 and is made large enough to seal the opening 3 in the compartment 1 when the drawer is closed. The drawer is supported on an extensible track comprising a movable upper section 6, which is adapted to be moved into and out of the compartment 1 through the opening 3 therein, and a stationary lower section 7 mounted in the lower part of said compartment. The movable upper track section 6 comprises an open frame whose side members are shaped to form rails 8. The lower track section also comprises a frame-like member whose side members are located outside of and slightly below the rails 8 of the upper track section 6 and are shaped to form rails 9. The inner end portion 10 of the lower track section 7 rests on and is secured to the bottom of the drawer compartment by means of bolts 11; and the rails 9 of said section are spaced above the bottom of said compartment and have their outer ends rigidly secured to the front wall of said compartment by means of bolts 12. The drawer 2 is provided with rollers 13 that run on the rails 8 of the upper track section 6 and are journaled on pins 14 mounted in brackets 15 depending from the bottom of said drawer near the corners thereof. The movable upper track section 6 is provided with rollers 16 that are journaled on pins 17 fixed to the rails 8 of said section and run on the rails 9 of the lower track section 7, there being two of said rollers on each side, one above and the other below the lower rail with which they cooperate so as to prevent downward tilting of said upper track section in the extended position thereof. The supporting brackets 15 for the innermost rollers 13 of the drawer 2 are provided with lugs 15a that extend beneath the rails 8 of the upper track section 6 and thus tend to hold the drawer down on said rails. These lugs are also adapted to abut against lugs 8a on the rails 8 of the movable upper track section 6 and thus force the same to move inwardly with the drawer. During the opening movement of the oven drawer, the outermost rollers 16 thereof abut against the front frame member of the movable upper track section 6 and thus cause the same to move outwardly with the drawer.

The drawer 2 is provided with a chamber forming a cooking oven 18 having an opening 19 in its top through which a suitable cooking vessel 20 is adapted to be inserted in and removed from said chamber or oven. The opening 19 in the top of the oven 18 is closed by means of a cover or closure member 21; and the bottom of said oven is also provided with an opening 22 that is closed by means of a closure member 23, which is located inside of said oven and serves to support and properly position the cooking vessel 20 therein. The combined closure and vessel supporting member 23 is provided in its top with a recess 24, which forms a seat for the cooking vessel 20, and at its bottom with an annular flange 25 of substantially bulb-shaped section that seats within an annular positioning groove 26, which is formed in the bottom of the oven and surrounds the opening 22 therein. The drawer compartment 1 is provided below the movable upper track section 6 with a suitable gas burner 27 which is supported on a cross bar 7a of the stationary lower track section 7; and the supply pipe 28 leading to said burner is supported by means of a suitable clip 29 fastened to the front wall of the drawer compartment 1. The gas burner 27 is located so that the opening 22 in the bottom of the oven 18 is positioned directly above said burner in the closed position of the drawer, whereby the combined closure and vessel supporting plate 23 is adapted to receive radiated heat from said gas burner. In order to reduce the loss of heat from the oven, the top and side walls of the drawer, together with the cover 21 for the food receiving opening 19 in said oven, are made hollow and filled with a suitable heat insulating material 30.

By the arrangement described, when the drawer 2 is closed the combined closure and vessel supporting plate 23 in the bottom of the oven 18 is located directly above the burner 26 in position to receive heat radiated therefrom; and said plate, in turn, serves to heat the vessel 20 resting thereon and said oven chamber. The insulated walls of the oven 18 operate to retain the heat therein; and the supporting plate 23 for the cooking vessel 20 serves to prevent loss of heat through the opening 22 in the bottom of said oven. Heat may be continuously applied to the oven for rapid cooking, or the burner may be cut off and the food cooked slowly by the heat radiated from the previously heated parts. The extensible supporting track for the drawer permits the same to be quickly and easily opened to permit access to be had to the oven and to the cooking vessel therein.

Obviously, the hereinbefore described arrangement admits of considerable modification without departing from the invention. Therefore, I do not wish to be limited to the precise arrangements shown and described.

What I claim is:

1. In combination with a cooking stove having a compartment, a drawer mounted in said compartment and having an enclosed chamber provided with openings in its top and bottom, closure members for the respective openings, and a heat generator located in said compartment below the bottom closure member, said bottom closure member being located inside of said chamber and constituting means for supporting and positioning a cooking vessel therein.

2. In combination with a cooking stove having a compartment, a drawer mounted in said compartment and having an enclosed chamber provided with openings in its top and bottom, closure members for the respective openings, and a heat generator located in said compartment below the bottom closure member, the walls and top of said drawer and the top closure member being insulated to reduce the loss of heat from said chamber.

3. In combination with a cooking stove having a compartment, a drawer mounted in said compartment and having an enclosed chamber provided with top and bottom openings, a closure member for the top opening, a heat generator located in said compartment below the bottom opening, and means in said chamber for supporting a cooking vessel therein above said opening.

4. In combination with a cooking stove having a compartment, a drawer mounted in said compartment and having an enclosed chamber provided with top and bottom openings, a closure member for the top opening, a heat generator located in said compartment below the bottom opening, and means in said chamber for supporting a cooking vessel therein above said opening, said drawer having heat insulated top and sides and a non-insulated bottom.

5. In combination with a cooking stove having a compartment, a drawer mounted in said compartment and having an enclosed chamber provided with top and bottom openings, a closure member for the top opening, a heat generator located in said compartment below the bottom opening, non-insulated means in said chamber for supporting a cooking vessel therein above said opening, and an extensible track for supporting said drawer.

6. In combination with a cooking stove having a compartment, a drawer mounted in said compartment and having an enclosed chamber, a heat generator located in said compartment below said drawer, said drawer having an opening in the top thereof through which a cooking vessel is adapted to be inserted in and removed from said chamber, a closure member for said opening, said chamber having an opening in its bottom, and a support for said vessel mounted in said chamber above said last mentioned opening.

7. In combination with a cooking stove having a compartment, a drawer mounted in said compartment and having an enclosed chamber, a heat generator located in said compartment below said drawer, said drawer having an opening in the top thereof through which a cooking vessel is adapted to be inserted in and removed from said chamber, a closure member for said opening, said chamber having an opening in its bottom, and a support for said vessel mounted in said chamber above said last mentioned opening, said chamber having a recess in its bottom adapted to receive and position said support relative to said bottom opening.

8. In combination with a cooking stove having a compartment, a drawer mounted in said compartment and having an enclosed chamber therein, said chamber having an opening in the top thereof through which a cooking vessel is adapted to be inserted in and removed from said chamber, a closure member for said opening, said chamber having an opening in its bottom, a plate mounted in said chamber for supporting said vessel and for closing said bottom opening, and a heat generator located in said compartment below said plate, the bottom of said chamber being provided with a groove which surrounds the opening therein and said plate being provided with a flange adapted to seat in said groove.

9. The combination with a cooking stove having a compartment, a drawer mounted in said compartment and having a chamber therein constituting an oven, said chamber having a food receiving opening in the top thereof, a heat generator located in said compartment below said drawer, and an extensible track for supporting said drawer, said track comprising a track section mounted in said compartment and a track section movably mounted on said first mentioned track section and movably supporting said drawer.

10. The combination with a cooking stove having a compartment provided with an opening, a drawer movable into and out of said compartment through the opening therein, said drawer having a chamber therein constituting an oven, said chamber having an opening in the top thereof through which a cooking vessel is adapted to be inserted in and removed from said chamber, a heat generator located in said compartment below said chamber, and an extensible track mounted in said compartment for supporting said drawer, said track comprising a stationary track section and a track section movably supporting said drawer and movable along said stationary track section into and out of said compartment through the drawer receiving opening therein.

MAURICE G. KLEMME.